US007479241B2

(12) United States Patent
Hasegawa

(10) Patent No.: US 7,479,241 B2

(45) **Date of Patent: *Jan. 20, 2009**

(54) MIXED CONDUCTOR

(75) Inventor: Norifumi Hasegawa, Sappro (JP)

(73) Assignee: Kabushikikaisha Equos Research (JP)

(*) Notice: Subject to any disclaimer, the term of this patent is extended or adjusted under 35 U.S.C. 154(b) by 244 days.

This patent is subject to a terminal disclaimer.

(21) Appl. No.: 10/509,752

(22) PCT Filed: May 14, 2004

(86) PCT No.: PCT/JP2004/006535

§ 371 (c)(1), (2), (4) Date: Sep. 30, 2004

(87) PCT Pub. No.: WO2004/102588

PCT Pub. Date: Nov. 25, 2004

(65) Prior Publication Data

US 2005/0104045 A1 May 19, 2005

Related U.S. Application Data

(63) Continuation-in-part of application No. 10/667,974, filed on Sep. 23, 2003, now Pat. No. 7,160,837.

(30) Foreign Application Priority Data

May 16, 2003 (JP) ............................ 2003-139431
Jun. 5, 2003 (JP) ............................ 2003-160342
Nov. 28, 2003 (JP) ............................ 2003-400158

(51) Int. Cl.
*H01B 1/00* (2006.01)
*H01B 1/04* (2006.01)
*B01J 21/18* (2006.01)

(52) U.S. Cl. ...................... 252/500; 252/502; 252/510; 252/511; 502/180; 423/448; 423/449.1; 423/449.6; 429/231.95; 429/231.1; 429/232

(58) Field of Classification Search ................ 252/514, 252/373, 500, 502, 510, 511; 429/17, 44, 429/30, 33, 231, 239, 112, 239.1, 231.95, 429/231.1; 204/296; 359/270; 502/108; 423/448, 449.1, 449.6
See application file for complete search history.

(56) References Cited

U.S. PATENT DOCUMENTS 4,436,796 A * 3/1984 Huggins et al. ............ 429/112
4,642,664 A 2/1987 Goldberg et al. ............... 257/1
4,725,422 A 2/1988 Miyabayashi et al. .......... 257/1
4,731,705 A * 3/1988 Velasco et al. .............. 361/502
4,804,592 A 2/1989 Vanderborgh et al. ......... 429/33
4,911,803 A 3/1990 Kunz .......................... 205/764
5,202,788 A * 4/1993 Weppner .................... 359/270
5,350,643 A * 9/1994 Imahashi et al. .............. 429/33
5,478,444 A * 12/1995 Liu et al. .................... 205/334
5,573,648 A 11/1996 Shen et al. .................. 204/412
5,670,270 A * 9/1997 Wallin ......................... 429/33
5,821,185 A * 10/1998 White et al. .................... 502/4
6,059,943 A * 5/2000 Murphy et al. ............. 204/296
6,187,157 B1 2/2001 Chen et al. .................. 204/296
6,235,417 B1 * 5/2001 Wachsman et al. ............ 429/17
6,296,687 B2 * 10/2001 Wachsman et al. ............. 95/55
6,352,797 B1 * 3/2002 Yoshida et al. .............. 429/313
6,387,230 B1 * 5/2002 Murphy et al. .............. 204/296
6,468,684 B1 * 10/2002 Chisholm et al. ............. 429/33
6,569,226 B1 * 5/2003 Dorris et al. .................... 95/56
7,160,837 B2 * 1/2007 Hasegawa ................... 502/180
2002/0110725 A1 8/2002 Yamaura et al. .............. 429/44
2002/0192538 A1 12/2002 Tanahashi et al. ............. 429/44
2003/0022055 A1 * 1/2003 Menashi ...................... 429/44
2003/0108785 A1 * 6/2003 Wu et al. ....................... 429/44
2005/0104045 A1 5/2005 Hasegawa ................... 252/500

FOREIGN PATENT DOCUMENTS

FR 2547678 A * 12/1984
JP 1998-255832 9/1998
JP 1999-335165 12/1999
JP 2000-188117 7/2000
JP 2000-251533 9/2000
JP 2001-110428 4/2001
JP 2001-202971 7/2001
JP 2003-68321 3/2003
JP 2003-100316 4/2003
WO WO/00/45447 3/2000

OTHER PUBLICATIONS

Balachandran et al "Development of mixed-conducting oxides for gas separation", Solid State Ionics 108 (1998) 363-370.*
Hawley's Condensed Chemical Dictionary, 11th Ed, pp. 12 and 219.

* cited by examiner

*Primary Examiner*—Douglas McGinty
*Assistant Examiner*—Khanh Tuan Nguyen
(74) *Attorney, Agent, or Firm*—Bacon & Thomas, PLLC

(57) ABSTRACT

A mixed conductor of this invention includes an electron conductor made of a carbon-based inorganic material imparted electron conduction by causing a main chain to have a $\pi$ bond, and a proton conductor made of an inorganic material having proton conduction, and the electron conductor and the proton conductor are fixed to each other by one of or all of a covalent bond, intercalation, and inclusion.

25 Claims, 9 Drawing Sheets

| Constituent elements |
| --- |
| ● Carbon (C) |
| ⊘ Oxygen (O) |
| ● Phosphorus (P) |

CONSTITUENT ELEMENTS
○ HYDROGEN (H)
● CARBON (C)
OXYGEN (O)
PHOSPHORUS (P)

MIXED CONDUCTOR

CROSS-REFERENCE TO RELATED APPLICATIONS

This application is a National Phase Application (35 USC 371) of PCT/JP2004/006535. PCT/JP2004/006535 was filed as a Continuation-in-Part of U.S. application Ser. No. 10/667, 974, filed Sep. 23, 2003 now U.S. Pat. No. 7,160,837, and claims benefit thereof under 35 USC 365. This application also claims priority, under 35 USC 365, of Japanese Application No. 2003-139431 filed May 16, 2003, Japanese Application No. 2003-160342 filed Jun. 5, 2003, Japanese Application No. 2003-400158 filed Nov. 18, 2003.

TECHNICAL FIELD

The present invention relates to a mixed conductor which exhibits both electronic conduction and proton conduction. This mixed conductor can be used, for example, for the reaction layer of a fuel cell, a gas diffusion catalyst, the electrodes of an electrochemical sensor, and the like.

BACKGROUND ART

The reaction layer of a fuel cell is formed between a proton exchange membrane and a backing layer and supports a catalyst for accelerating an electrochemical reaction. A combination of the reaction layer and the catalyst layer constitutes the electrodes of the fuel cell. In the reaction layer on an air cathode side, for example, protons passing through the proton exchange membrane and electrons transferred to the air cathode are conducted up to the catalyst, thus binding oxygen and protons diffused onto the catalyst. Namely, the reaction layer needs to exhibit both proton conduction and electronic conduction in order to improve the transfer loss of oxygen, protons and electrons. To this end, a mixture of poly electrolyte having catalysts supported on surfaces such as carbon particles (exhibiting electronic conduction) and Nafion (trade name, manufactured by E.I du Pont de Nemours, this applies hereafter) which exhibits ionic conduction is used in the fuel cell.

However, if a material having ionic conduction and a material having electronic conduction are used together, it is difficult to mix them up completely uniformly. As a result, protons and electrons cannot be uniformly transferred to all catalyst particles.

To solve this disadvantage, there has been proposed a mixed conductor which exhibits both ionic conduction and electronic conduction using one material.

For example, organic mixed conductors are disclosed in JP2001-202971A, JP2001-110428A, JP2003-68321A and JP2002-536787A.

In addition, inorganic mixed conductors conducting electrons and oxygen ions are disclosed in JP1998-255832A, JP1999-335165A, JP2000-251533A, and JP2000-18811A.

DISCLOSURE OF INVENTION

Since the organic mixed conductors are made of organic materials, they have many problems in terms of durability and heat resistance to be solved before being put to practical use.

As for the inorganic mixed conductors which transfer electrons and oxygen ions, operating temperatures thereof are high (about 800° C.). Due to this, it is considered that these inorganic mixed conductors are inappropriate for small-sized fuel cells suitably used in, for example, vehicles and cellular phones.

After exerting utmost efforts in study to solve these disadvantages, the inventor of the present invention discovered a novel inorganic mixed conductor and finally completed the present invention.

That is, the inventor of the present invention discovered a mixed conductor characterized by being a compound of an electron conductor made of an inorganic material and a proton conductor made of an inorganic material.

Being a compound, this mixed conductor as a whole is capable of electron conduction and proton conduction while the electron conductor and the proton conductor thereof are strongly bonded together so as not to dissolve in water.

Preferably, the electron conductor is obtained by carbonizing an organic material.

BEST MODE FOR CARRYING OUT THE INVENTION

Figure 1:
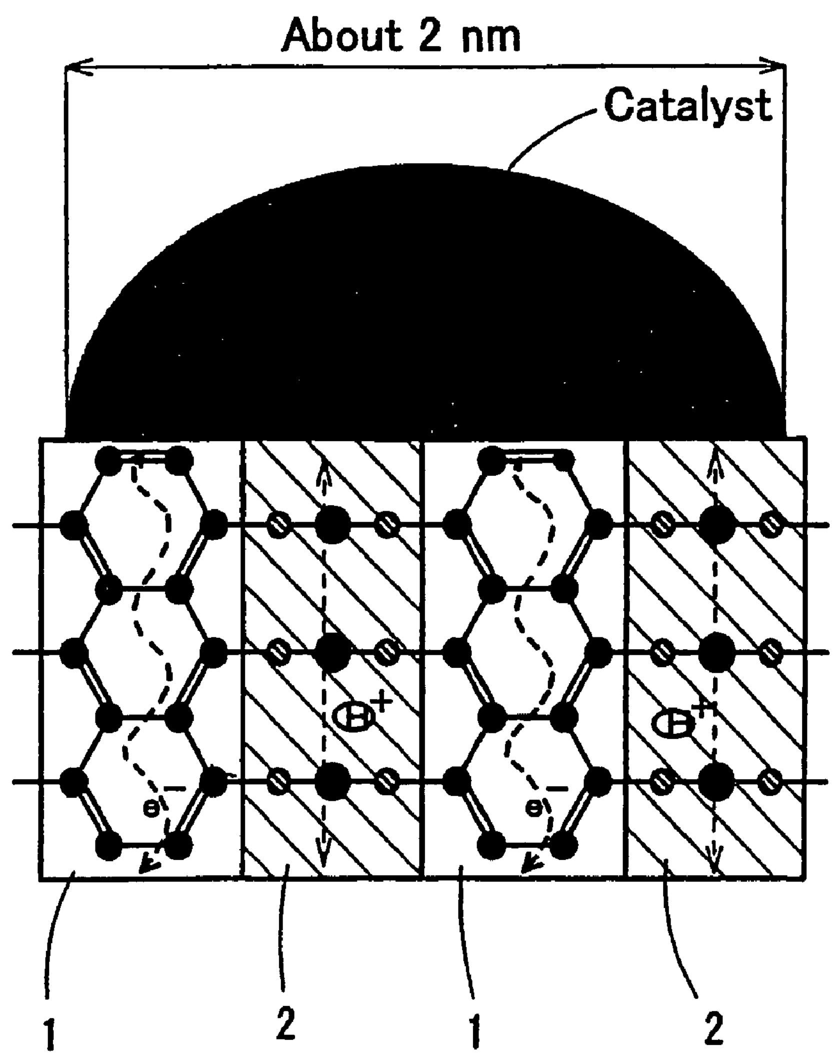
FIG. 1 is a typical view illustrating the structure of a mixed conductor according to the present invention.
Figure 2:
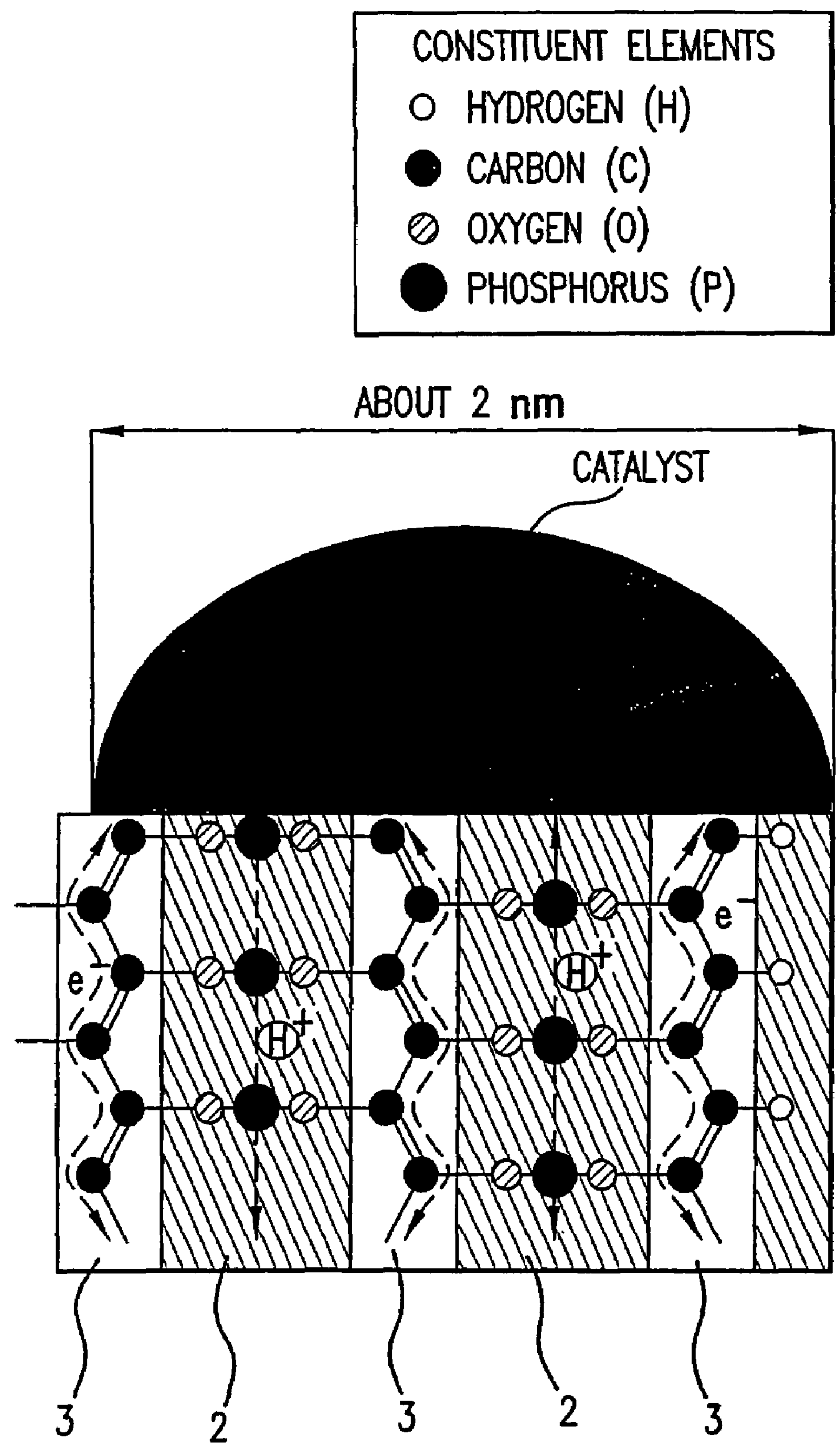
FIG. 2 is a typical view illustrating the structure of the mixed conductor according to the present invention.

As the electron conductor made of an inorganic material, an electron conductor of such a type as to cause a main chain to have one of or both of a carbon-carbon double bond and a carbon-carbon triple bond, the main chain contributing to an electronic conduction function as shown in FIGS. 1 and 2. may be used or such a type as to transfer electrons through a side chain.

It is also preferable that such an electron conductor uses an inorganic material obtained by carbonizing an organic compound having a $\pi$ bond. Examples of the organic compound having a $\pi$ bond include aliphatic hydrocarbon, aromatic hydrocarbon and derivatives of the aliphatic hydrocarbon and the aromatic hydrocarbon. At least one of them is used for the organic compound having the $\pi$ bond. Typical examples of the organic compounds include polyacetylene, resorcinol, phenol, phenylphenol, polyaniline, polypyrrole, polythiophene, phenylphosphonic acid, phenylsilane alkoxide, pyrogallol, and dihydroxybiphenyl.

Further, the inorganic material for the electron conductor can be a carbonaceous material such as graphite or a carbon nanotube or a metallic material containing a metal such as gold, palladium, platinum, magnesium, lithium or titanium, or an alloy thereof.

As the proton conductor made of an inorganic material, one of a phosphorus-containing compound, a sulfur-containing compound, carbonic acid, boric acid, and inorganic solid-state acid, particularly at least one of a phosphorus-containing compound, phosphoric acid, phosphoric ester, sulfuric acid, sulfuric ester, sulfuric acid, tungsten oxide hydroxide, rhenium oxide hydroxide, silicon oxide, tin oxide, zirconia oxide, tungstophosphoric acid, and tungstosilicic acid can be used.

According to the present invention, these inorganic electron conductors and these inorganic proton conductors form a compound in which the electron conductors and the proton conductors are strongly bonded together. As a result, when the mixed conductor of the present invention is immersed in water, hardly any proton conductor are desorbed. Additionally, the mixed conductor, as a whole, is capable of electron conduction and proton conduction.

The foregoing compound may be formed (i.e., the electron conductor may fixed to the proton conductor) by a covalent bond, intercalation or inclusion. However, depending on production process conditions, these manners of fixing may possibly be mixed.

Further, whether the state of fixing is by covalent bond, intercalation or inclusion is set according to the types of the materials of the electron conductor and the proton conductor. For example, if the electron conductor is made of an inorganic material obtained by carbonizing an organic material, the fixing may be made mainly by a covalent bond. If the electron conductor is made of a metal material and an inorganic material, particularly an oxide is selected as a material for the proton conductor, for example, the both conductors can be fixed to each other by a covalent bond or inclusion.

The state in which the electron conductors and the proton conductors are fixed to each other by a covalent bond is illustrated in FIGS. 1 and 2. Since the electron conductors 1 or 3 and the proton conductors 2 bound by a covalent bond are arranged in close proximity, both the electron conductors and the proton conductors can contact with a catalyst particle (e.g., platinum) in nano order as shown therein. Accordingly, it is possible to supply electrons and protons necessary for a catalytic reaction to the catalyst in proper quantities.

Such a mixed conductor is formed as follows.

First, a high molecular precursor is formed by polymerizing an organic compound having a π bond with a proton conducting material. In this high polymer precursor, it is considered that carbons mainly constituting the organic compound are polymerized with one another to form an electron conducting main chain having a π bond and also form a covalent bond with the proton conductor, and that this proton conductor bridges the carbon main chain of the electron conductor. By mixing the proton conductor in sufficient quantities, the distance between the proton conductors bound to the carbon main chain by covalent bonds is narrowed, and proton conduction is generated between the proton conductors.

Further, a precursor obtained by dispersing a proton conductor into a polymer of an organic compound having a π bond may be prepared.

In a case where degree of polymerization is low, it results in precursor in which proton conductor is dispersed in a polymerized organic compound. In a case where degree of polymerization is no sufficient, it results in a precursor in which both a proton conductor covalent bonding to an organic compound forming an electron conductor and a proton conductor, isolating from the former proton conductor, being substantially dispersed are existed.

This precursor is pyrolysis under an inert atmosphere. As a result, the organic compound is carbonized into an inorganic material, thereby ensuring electronic conduction.

In addition, the proton conductor is stably fixed to the electron conducting carbon skeletons. As a result, proton conduction is ensured. It is considered that the proton conduction is attained by arranging proton conductor allocation materials to be proximate to each other. As shown in FIGS. 1 and 2, if the proton conductors bridge the carbon skeletons, the positions of the proton conductors are fixed, thereby ensuring the proton conduction by the interaction between the proton conductors.

If the proton conductors are released from the carbon skeletons or if the proton conductors are not bound to the carbon skeletons from the state of the precursor, then it is considered that the proton conductors are intercalated into the carbon main chain or included in a mesh structure formed by the carbon main chain. In any case, it is considered that the proton conduction can be ensured as long as the proton conductors are in proximity.

As can be seen, since the proton conductors are integrated into a compound and are bound, intercalated or included between the carbon skeletons, the proton conductor does not float. Due to this, even if the mixed conductor is used at a location where water is present, the proton conductor does not flow out by the water. The compound as a whole is capable of electron conduction and proton conduction. That is, a rate of lowering the proton conduction by water is very low.

Preferably, the precursor is heated or pressure-heated prior to the burning step. Such heating or pressure-heating of the precursor will result in an increased phosphorus content after the burning step. The method employed for heating or pressure-heating the precursor is not limited to any specific one. Rather, any commonly employed method may be utilized.

As the precursor is heated while in a boil, steam generated from the heating is liquefied by cooling and returned to the reaction vessel. Refuxing is employed during the manufacture because the cooler is preferably installed in association with the reaction vessel. Such refluxing permits the atmosphere used with the precursor to be heated without any pressurization. Specific heating temperature and duration are selected to suit the characteristics of the precursor.

The method employed for heating or pressure-heating the precursor is not limited to any specific one. However, utilizing an autoclave is preferred from the standpoint of workability and other related factors. Specific pressure of the atmosphere applied to the precursor and the atmospheric temperature are selected according to the characteristics of the precursor.

Now, examples of the organic compound having a π bond include unsaturated aliphatic hydrocarbon and aromatic hydrocarbon. More concretely, at least one of polyacetylene, resorcinol, phenol, phenylphenol, polyaniline, polypyrrole, polythiophene, phenylphosphonic acid, phenylsilane alkoxide pyrogallol, and dihydroxybiphenyl can be selected as a material for the organic compound having a π bond.

Further, examples of the proton conducting material include a phosphorus-containing compound, a sulfur-containing compound, carbonic acid, boric acid, and inorganic solid-state acid. Examples of the phosphorus-containing compound include phosphoric acid and principle examples of the sulfur-containing compound include sulfuric acid and sulfonic acid. Further, an inorganic proton conducting material can be produced using a derivative of one of these compounds as a starting material. In this case, particularly at least one of a phosphorus-containing compound, phosphoric acid, ester phosphate, sulfuric acid, ester sulfate, sulfuric acid, tungsten oxide hydroxide, rhenium oxide hydroxide, silicon oxide, tin oxide, zirconia oxide, tungstophosphoric acid, and tungstosilicic acid can be used.

To mineralize the organic compound in the precursor, it is preferable that the precursor is burned under an inert atmosphere.

The inert atmosphere can be attained by putting the precursor under the distribution of argon gas, nitrogen gas, or helium gas or in vacuum.

If the precursor is pyrolyzed under such an inert atmosphere, the organic component of the precursor is carbonized into an inorganic material. If the main chain of the organic component has a π bond, high electron conduction is ensured.

Heating temperature and heating time are appropriately selected according to the characteristics of the precursor.

Simultaneously with or after heating, a high energy other than heat can be applied to the precursor. Examples of the high energy include plasma radiation, microwave radiation and ultrasonic radiation.

As described above, the mixed conductor according to the present invention is made of inorganic materials and exhibit both an electron conducting function and a proton conducting function. In addition, even in a low temperature range close to a room temperature, the mixed conductor functions properly. Further, even if water is present, the mixed conductor exhibits both electron conduction and proton conduction.

The above-stated advantages of the mixed conductor according to the present invention will be confirmed hereinafter by way of exemplary embodiments.

Figure 3:
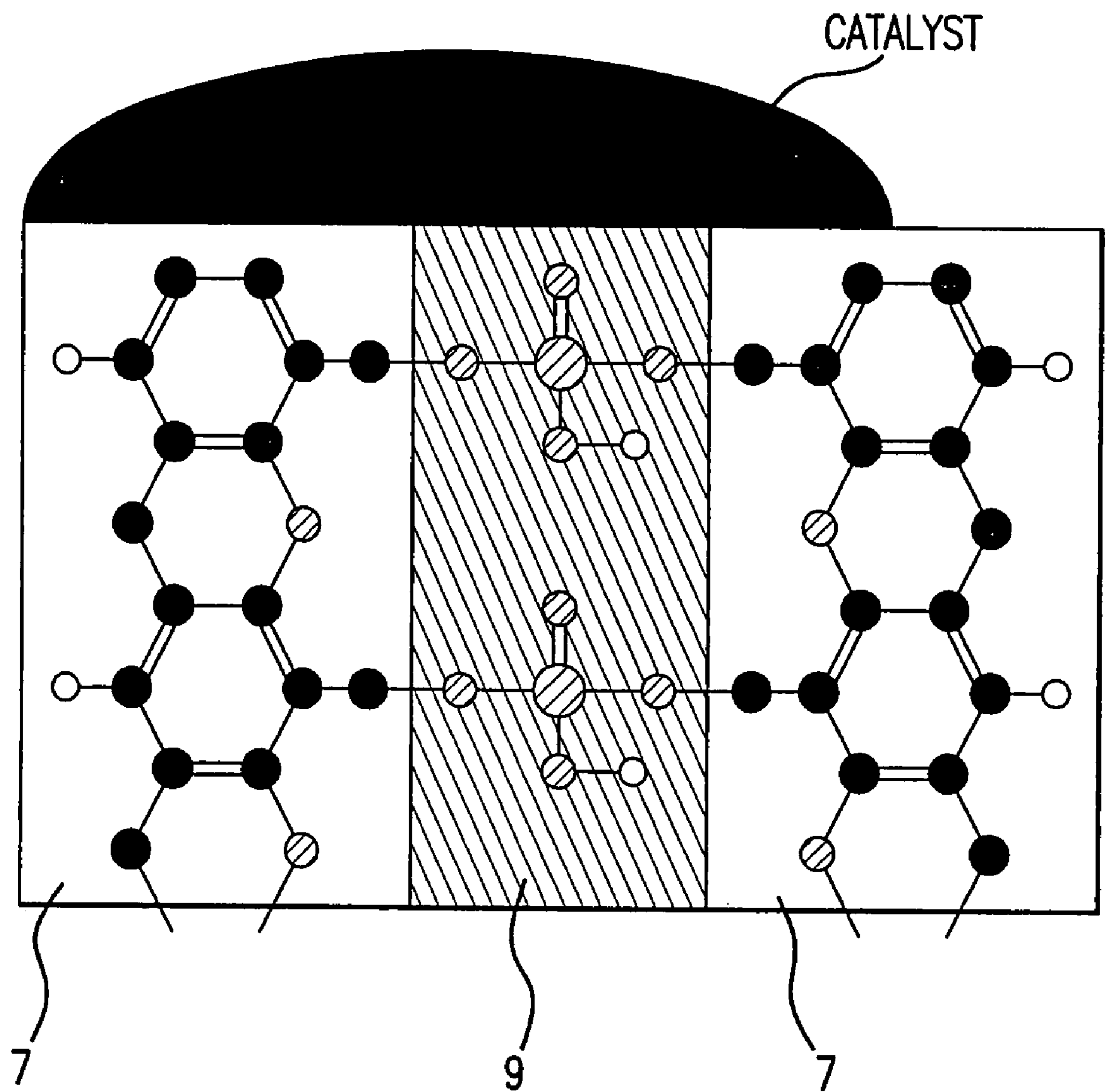
FIG. 3 is a typical view illustrating the structure of the mixed conductor in one embodiment according to the present invention.

First, a method for producing a mixed conductor will be described with reference to the following chemical formula 1 as well as FIG. 3.

Chemical formula 1

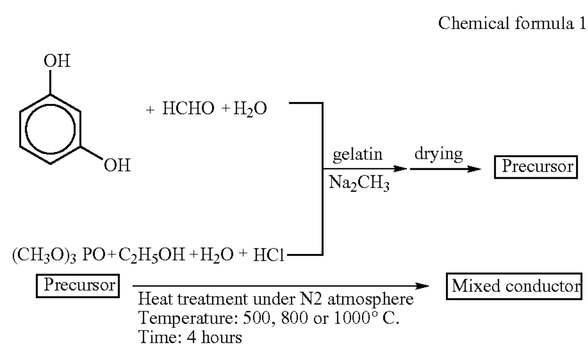

Resorcinol (10 g) and formaldehyde (13 ml) are dissolved in water (40 ml), and a solution obtained by hydrolyzing trimethyl phosphate is added to the solution. The resultant solution is dehydrated and condensed with $Na_2CO_3$ as a catalyst to gelate the solution. This gel is dried at 120° C., thereby obtaining a precursor.

Figure 4:
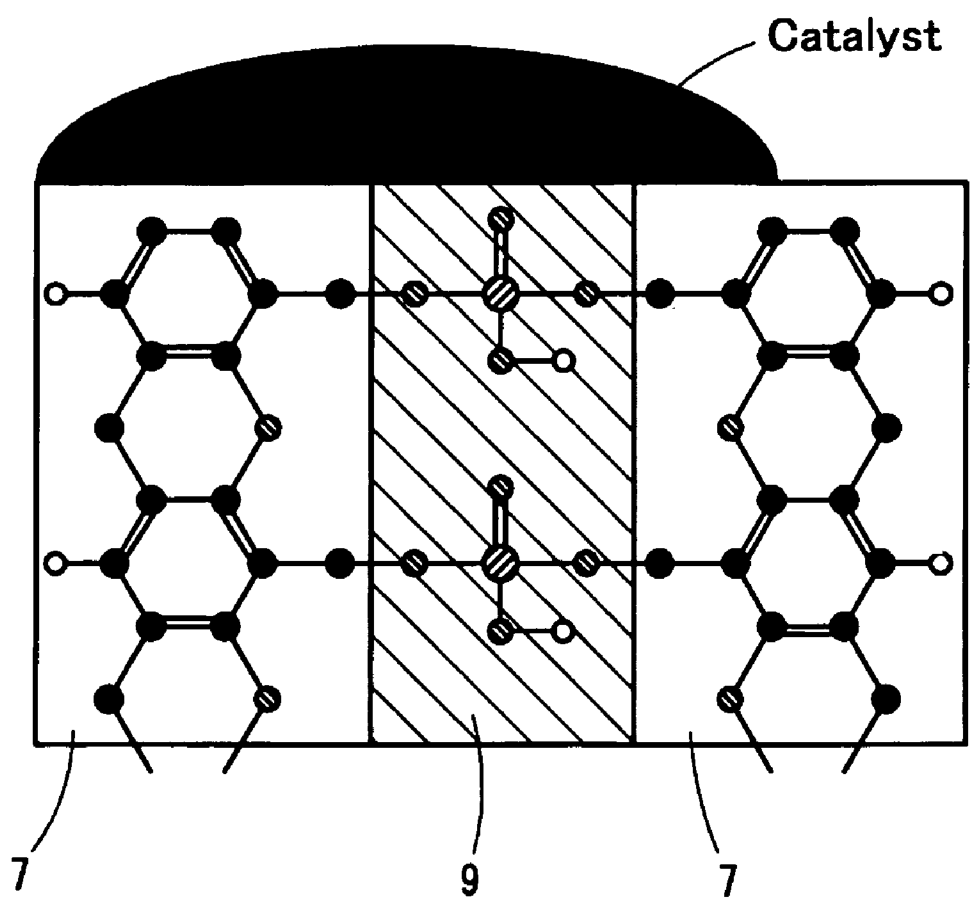
FIG. 4 is a typical view illustrating the structure of precursor.

This precursor is subjected to a pyrolysis (at 500 to 1000° C.) under a nitrogen atmosphere to obtain a mixed conductor in the embodiment. This mixed conductor is constituted so that electronic conductor phases 7 of a graphite-like structure and proton conductor phase 9 containing phosphoric acid group are alternately aligned as shown in FIG. 4.

The mixed conductor thus obtained is ground, pressure-formed into a plate, and put between current collecting plates to supply a DC current to the plate-formed mixed conductor. Specific resistance of each embodiment is obtained from a voltage at that time. Measurement temperature is a room temperature.

| | Embodiment 1 | Embodiment 2 | Embodiment 3 |
|---|---|---|---|
| Heat treatment temperature | 500° C. | 800° C. | 1000° C. |
| Specific resistance (O · cm) | 138 | 0.35 | 0.13 |

In the embodiments, the reason of high specific resistance at a heating temperature of 500° C. is considered to be insufficient carbonization of an organic material.

The heating temperature and heating time are parameters that can be appropriately selected according to the structure and the like of the organic compound.

The specific resistance was determined as follows:

1/specific resistance=conductivity=1/(resistance×geometrical surface area of sample/thickness), in which resistance=applied voltage/response current.

The proton conductivity and the electron conductivity (described below) are calculated in the same manner. To calculate the proton conductivity, a sample is sandwiched between a material, such as a Nafion membrance, that conducts protons but not electrons. Whereas, to calculate the electron conductivity, a sample is sandwiched between a material, such as copper, that conducts electrons but not protons.

Next, a proton conduction test will be described with reference to FIGS. 5 and 6.

Figure 5:
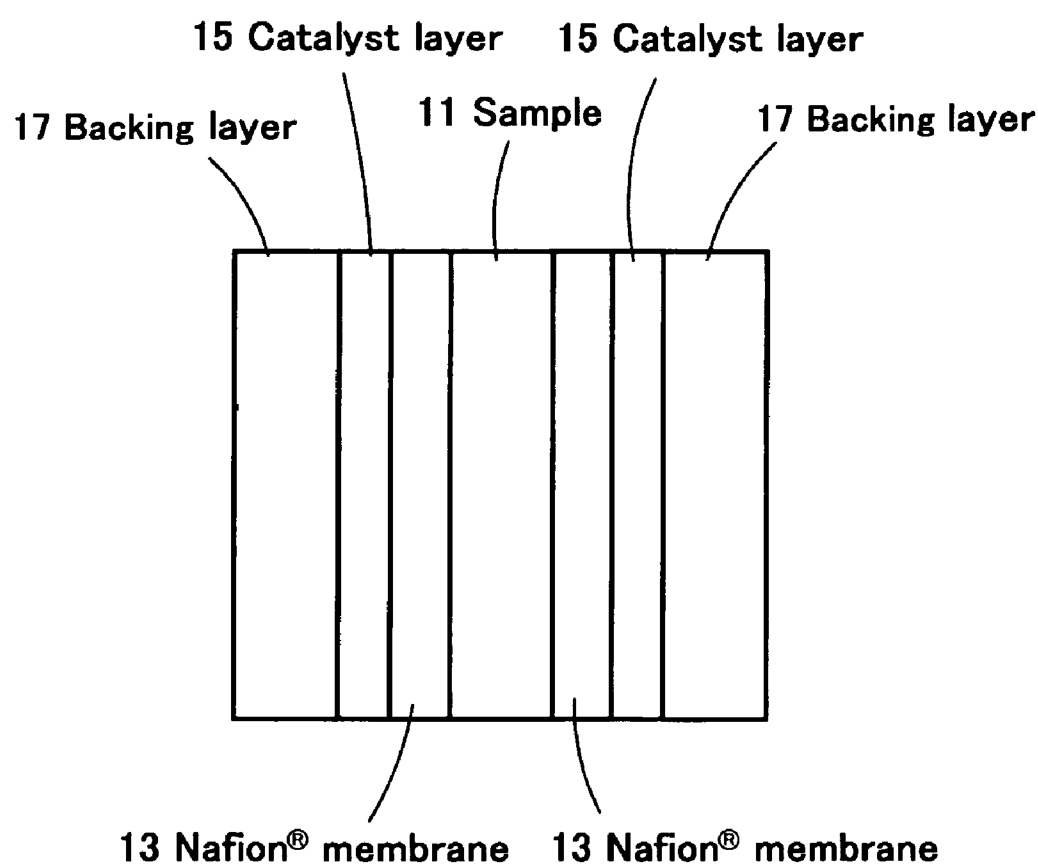
FIG. 5 is a typical view of a holder for checking the proton conducting function of the mixed conductor in the embodiment.

As shown in FIG. 5, a backing layer 17 consisting of a carbon cloth and catalyst layer 15 is attached to each side of a sample 11 in each of Embodiments 1 to 3. A Nafion membrane 13 transmits protons but blocks electrons.

A holder shown in FIG. 5 is put in a container, and nitrogen gas or hydrogen gas at a temperature of 60° C. and a relative humidity of 100% is introduced into the container. A voltage-current characteristic at that time is shown in FIG. 6.

Figure 6:
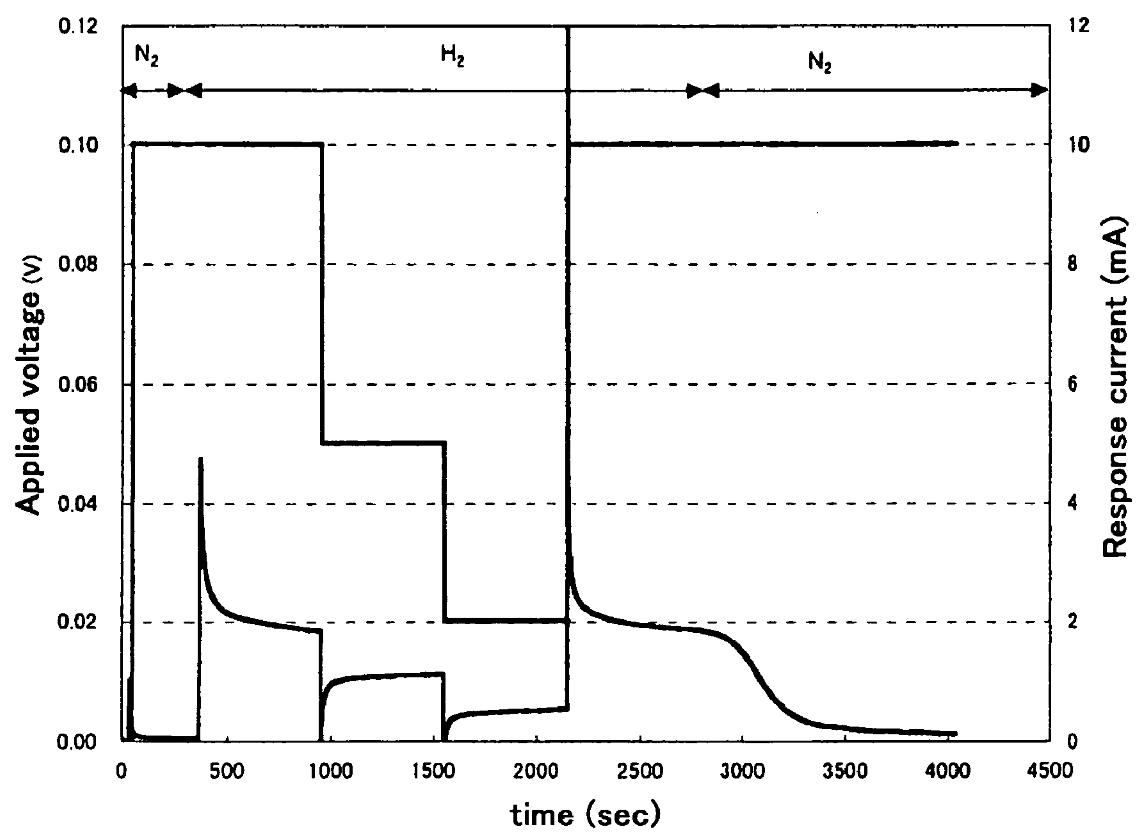
FIG. 6 is a chart showing the current-voltage characteristics of the holder shown in FIG. 4.

As can be seen from FIG. 6, even if a voltage is supplied between the backing layers 17, 17 while introducing the nitrogen gas, no current is carried. On the other hand, if hydrogen gas is introduced into the container, it can be seen that a current flows. This demonstrates that the sample 11 has proton conduction.

Further, the proton conductivity of each sample is calculated as follows.

| | Embodiment 1 | Embodiment 2 | Embodiment 3 |
|---|---|---|---|
| Heat treatment temperature | 500° C. | 800° C. | 1000° C. |
| Proton conductivity (S/cm) | $2.6 \times 10^{-3}$ | $1.3 \times 10^{-3}$ | $7.3 \times 10^{-4}$ |

Further, as comparative examples, the proton conductivities of samples similarly subjected to a heat treatment by the formation method in the embodiments already described above and to which trimethyl phosphate are not added are calculated as described above.

| | Comparative Example 1 | Comparative Example 2 | Comparative Example 3 |
|---|---|---|---|
| Heat treatment temperature | 500° C. | 800° C. | 1000° C. |
| Proton conductivity (S/cm) | $1.0 \times 10^{-6}$ or less | $1.0 \times 10^{-6}$ or less | $1.0 \times 10^{-6}$ or less |

By comparing the samples to which trimethyl phosphate is added with those to which trimethyl phosphate is not added, the appearance of proton conduction by phosphorus is proven.

Figure 7:
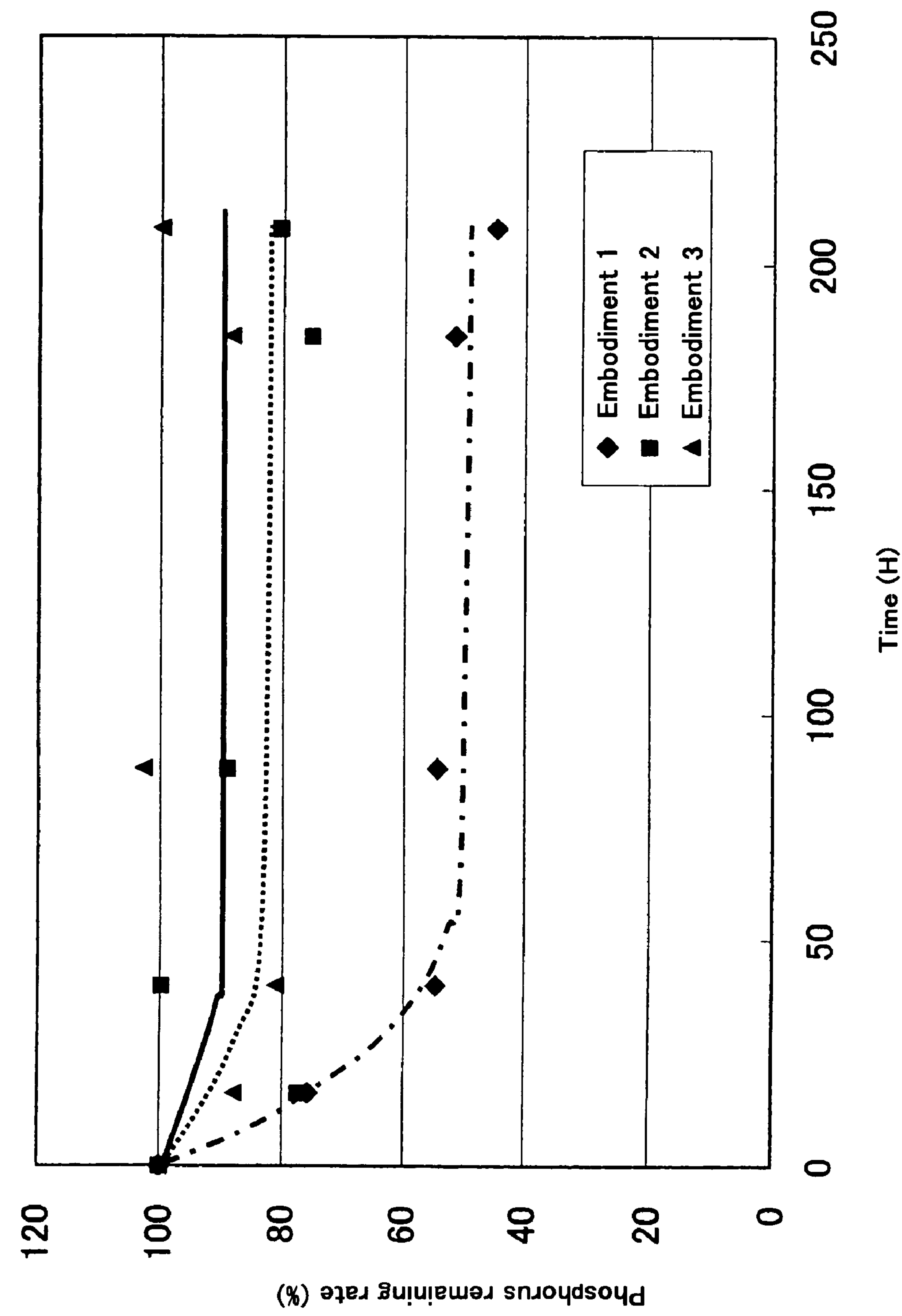
FIG. 7 is a chart showing the change of a phosphoric acid remaining rate with time in the mixed conductor in pure water in the embodiment.

The relationship between immersion time and phosphorus remaining rate when samples (0.1 g) in the respective embodiments are immersed in 100 cc of pure water at a room temperature is shown in FIG. 7.

In FIG. 7, the phosphorus remaining rate is measured by an EDX analyzer (HORIBA Ltd.).

The result shown in FIG. 7 confirms that about 60% of phosphorus, about 80% of phosphorus, and about 90% of phosphorus (i.e., proton conduction) remains in the samples in Embodiments 1, 2, and 3, respectively.

This demonstrates that the mixed conductors in the embodiments keep their proton conducting functions even in a humid environment for a long time.

The mixed conductors can be used for fuel cells, and particularly suitably used for the reaction layers (catalyst layers) constituting the respective fuel cells. The reaction layer is a location where oxygen or hydrogen supplied from the outside through the backing layers is ionized, and is normally arranged between the proton exchange membrane and the backing layer.

Examples of a method for producing a reaction layer (catalyst layer) if one of the mixed conductors is used as the reaction layer will next be described.

EXAMPLE 1

Each of the mixed conductors produced above is ground to powder by a ball mill or the like, and the mixed conductor thus ground is caused to support a platinum catalyst. The mixed conductor can be made to support the platinum catalyst by the same method as that for causing a carbon holder in a process of forming a supported platinum carbon that constitutes the reaction layer of an ordinary fuel cell to support a platinum catalyst. For example, chloroplatinic acid solution is impregnated with the mixed conductor powder and then subjected to a reducing treatment, whereby the mixed conductor can support platinum catalyst.

The supporting mixed conductor is mixed into a Nafion solution, a paste of a mixture thereof is produced, and this paste is screen-printed on each surface of an proton exchange membrane (a Nafion membrane in this example). As a result, a reaction layer containing the mixed conductor is formed. Further, a backing layer is connected to the outside of the reaction layer, whereby a unit fuel cell that constitutes the fuel cell, i.e., a unit cell can be produced.

EXAMPLE 2

Each of the mixed conductors produced above is ground to powder by a ball mill or the like, and the mixed conductor thus ground is caused to support a platinum catalyst.

Next, the powder of the mixed conductor which supports the catalyst is subjected to hot pressing, thereby forming the mixed conductor into a shape corresponding to a target electrode to produce a reaction layer. This reaction layer is superposed on the proton exchange membrane and hot press is conducted, whereby an integral formed article having the proton exchange membrane put between the reaction layers is produced.

By further connecting a backing layer to the outside of the catalyst layer, a unit cell of the fuel cell can be produced.

In the tests stated above, the mixed conductors in the examples exhibit both proton conduction and electronic conduction at a low temperature in a range of a room temperature to 60° C. Depending on the presence of water, it is considered that the mixed conductors exhibit the equivalent functions up to 200° C. under an atmosphere.

It is seen that the mixed conductors in the embodiments can exhibit their functions even at an extremely low temperature as compared with the conventional inorganic-based mixed conductor which exhibits its functions at a high temperature of about 800° C.

Furthermore, as is obvious from the structure shown in FIG. 4, the electronic conductor phase 7 is connected to the proton conductor phase 9 by a covalent bond, so that they are quite proximate to each other. Due to this, even if a catalyst particle is very small, the electron conductor 7 and the proton conductor 9 can be always brought into contact with the catalyst particles simultaneously. This makes it possible to supply electrons and protons necessary for a catalytic reaction to the catalyst in proper quantities and thereby improve catalyst utilization efficiency.

Another embodiment will now be described.

FORMURA 2

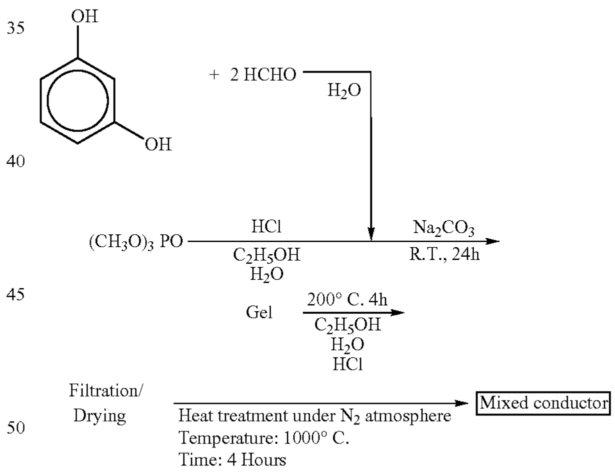

As shown in Chemical Formula 2 above, resorcinol (5 g) was dissolved in pure water (20 ml) and formaldehyde (6.7 ml) was added thereto. Meanwhile, trimethyl phosphate (5.2 ml) was stirred in a mixed solution of pure water (3.2 ml), ethanol (10.5 ml), and hydrochloric acid (124 μl) for one hour to hydrolyze the trimethyl phosphate. The solution obtained by hydrolyzing trimethyl phosphate was added to the resorcinol/formaldehyde aqueous solution. After $Na_2CO_3$ (0.47 g) was also added, the solution was left to stand at a room temperature for 24 hours to gelate the solution.

Figure 8:
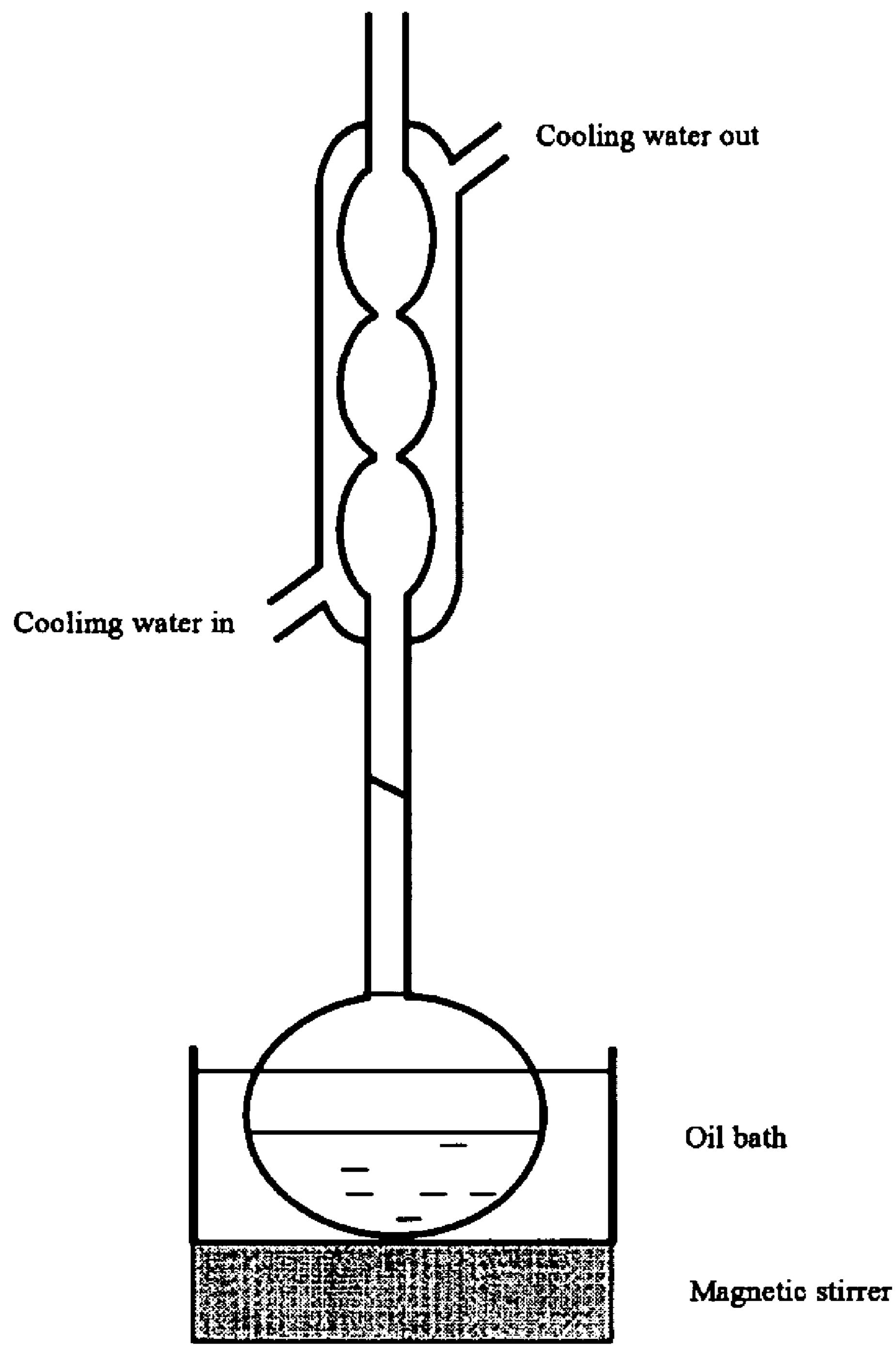
FIG. 8 shows the structure of reflux condenser used in the other embodiment.

The resultant gel was ground and was refluxed in a mixed solution of trimethyl phosphate (5.2 ml), pure water (3.2 ml), ethanol (10.5 ml), and hydrochloric acid (124 μl) in an oil bath at a temperature of 200° C. for four hours. FIG. 8 shows the apparatus used for the reflux. The mixed conductor of the embodiment was obtained by filtering, drying, and subjecting the resultant sample to heat-treatment under an inert atmosphere at 1000° C. for four hours.

The mixed conductor thus obtained was further ground by a ball mill and formed into disk-shaped samples having a diameter of 15 mm and a thickness of about 3 mm using an SPS sintering machine. Each sample was interposed between Nafion membranes as well as catalyst layers to form a holder shown in FIG. 5. The holder was placed in a container, and nitrogen gas and hydrogen gas at a temperature of 60° C. and a humidity of 100% were introduced into the container. A voltage was applied to the holder to obtain response current. A voltage-current characteristic of the mixed conductor of Embodiment 4 was determined from the response current (similar to that shown in FIG. 6). The proton conductivity was determined from this characteristic by calculation as $5.6\times10^{-3}$ S/cm. The amount of phosphorus in the sample (Pmol/Cmol) was 4.8% as determined by an EDX analyzer.

Another embodiment will now be described.

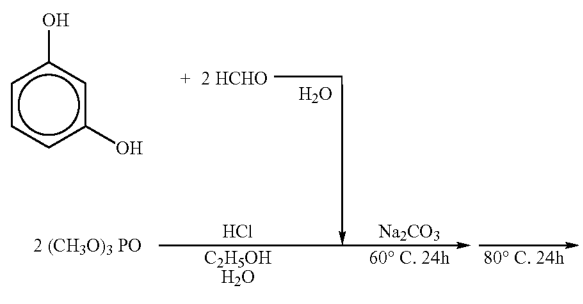

-continued

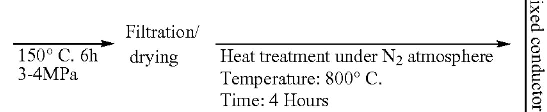

As shown in Chemical Formula 3 above, resorcinol (2 g) and formaldehyde (2.7 ml) were dissolved in pure water (8 ml). Meanwhile, trimethyl phosphate (4.2 ml) was stirred in a mixed solution of pure water (2.6 ml), ethanol (5.0 ml), and hydrochloric acid (99 μl) for one hour to hydrolyze the trimethyl phosphate. The second solution was added to the first solution. After $Na_2CO_3$ (0.19 g) was also added, the solution was stirred at a room temperature for three hours, then left standing at 60° C. for 24 hours, and at 80° C. for another 24 hours.

Figure 9:
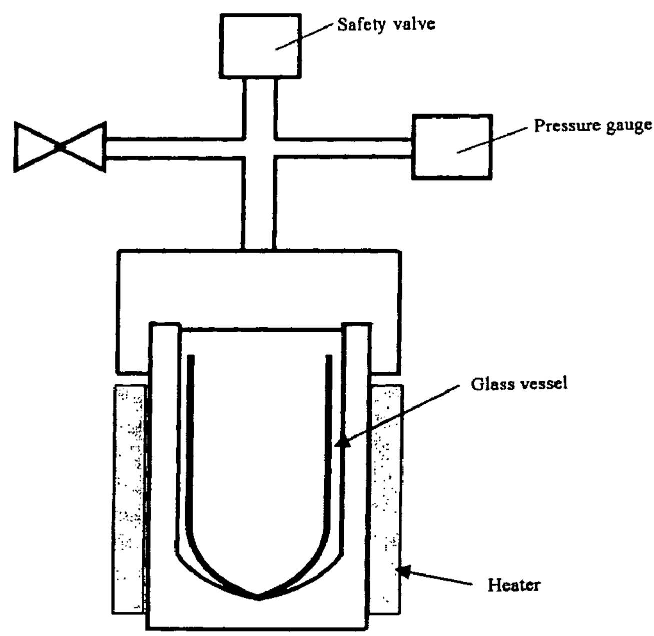
FIG. 9 shows the structure of autoclave used in the other embodiment.

The sample was heated in an autoclave having an internal space of 120 cc (see FIG. 9) at 150° C. for six hours. The internal pressure within the autoclave rises to about 3-4 MPa due to the self-developed pressure of the solvents.

The mixed conductor of the embodiment was obtained by filtering, drying, and subjecting the resultant sample to heat-treatment under an inert atmosphere at 800° C. for four hours.

The mixed conductor thus obtained was further ground in a ball mill and pressure-formed into disk-shaped samples having a diameter of 15 mm and a thickness of about 3 mm using an SPS (spark plasma sintering) sintering machine. Each sample was interposed between Nafion membranes as well as catalyst layers to form a holder shown in FIG. 5. The holder was placed in a container, and nitrogen gas and hydrogen gas at a temperature of 60° C. and a humidity of 100% were introduced into the container. A voltage was applied to the holder to obtain response current. A voltage-current characteristic of the mixed conductor of Embodiment 5 was determined from the response current (similar to that shown in FIG. 6). The proton conductivity was determined from this characteristic by calculation as $1.5\times10^{-2}$ S/cm. The amount of phosphorus in the sample (Pmol/Cmol) was 5.8%. The phosphorus amount in this embodiment was determined in the same manner as in Embodiment 4.

Figure 10:
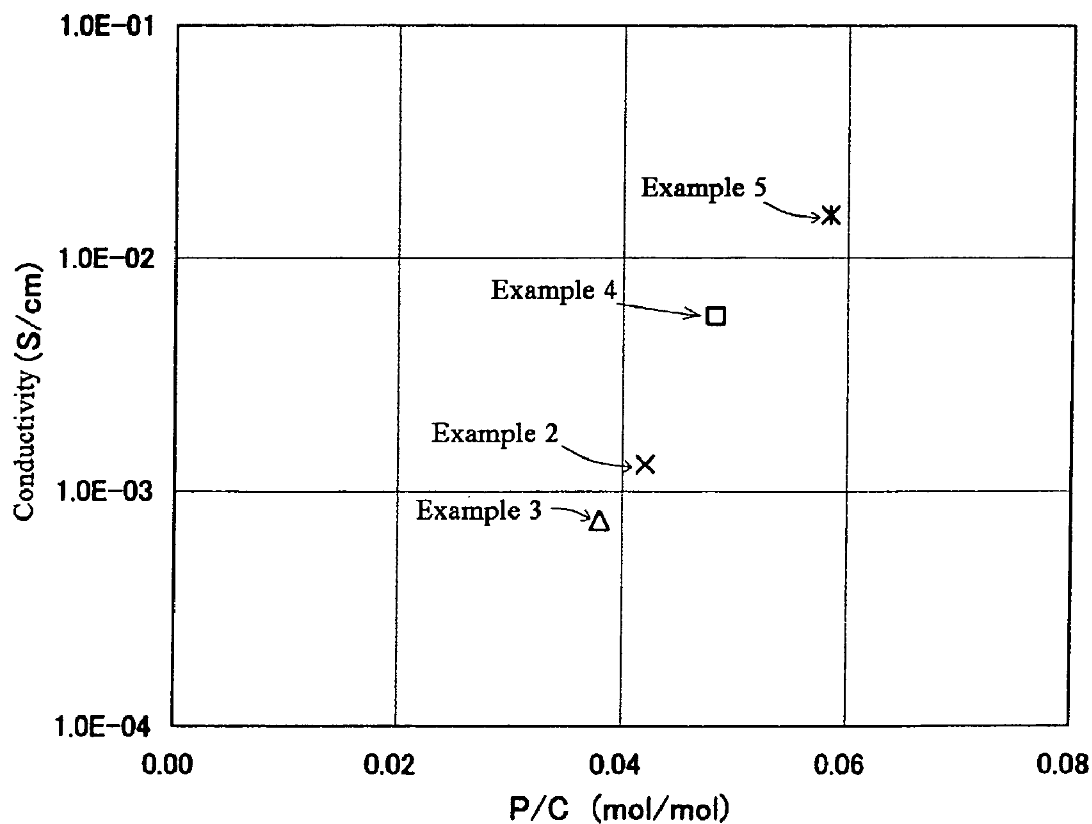
FIG. 10 shows the relationship between proton conductivity and phosphorus amount in mixed conductor of respective embodiments.

Table 1 below and FIG. 10 show the relationship between the phosphorus content and the proton conductivity of each of the foregoing embodiments.

TABLE 1

| | Embodiment 2 | Embodiment 3 | Embodiment 4 | Embodiment 5 |
|---|---|---|---|---|
| Pretreatment of precursor | — | — | Reflux at 200° C. | Autoclave (150° C.) |
| Sintering temperature (° C.) | 800 | 1000 | 1000 | 800 |
| Phosphorous content (Pmol/Cmol) | 4.2% | 3.8% | 4.8% | 5.8% |
| Proton conductivity (S/cm) | $1.3\times10^{-3}$ | $7.3\times10^{-4}$ | $5.6\times10^{-3}$ | $1.5\times10^{-2}$ |

These comparisons demonstrate that heating or pressure-hearting of precursors imparts an increased phosphorus content and thus an improved proton conductivity to the mixed conductors obtained upon the heat treatment.

Embodiment 6

Two grams of phenol was dissolved in a mixed solution of 5 cc of ethanol in 30 cc of pure water, to which 3.15 cc of a formaldehyde solution was then added. After 4.89 cc of a trimethyl phosphate solution was added to this, the solution was stirred for one hour, and then 0.089 gram of sodium carbonate was added. The solution was then stirred at a room temperature overnight. After the solution was left standing at 70° C. under a sealed condition for 24 hours, the solvent was removed. The resultant sample was subjected to heat treatment at 500° C. under a nitrogen gas atmosphere for 4 hours to obtain the mixed conductor of this embodiment.

Embodiment 7

Two grams of pyrogallol was dissolved in 8 cc of pure water, to which 2.36 cc of a formaldehyde solution was then added. After 3.65 cc of a trimethyl phosphate solution was added to this, the solution was stirred for one hour, and then 0.0167 gram of sodium carbonate was added. The solution was then stirred at a room temperature for three hours. After the solution was left at rest at 50° C. under a sealed condition for 24 hours, it was further left at rest at 80° C. under a sealed condition for 72 hours. The resultant gel was subjected to heat treatment at 800° C. under a nitrogen gas atmosphere for 4 hours to obtain the mixed conductor of this embodiment.

Embodiment 8

Three grams of dihydroxybiphenyl was dissolved in 12 cc of a mixed solution of ethanol and water, with an ethanol/water volume ratio of 1/1, to which 4.84 cc of a formaldehyde solution was then added. After 7.49 cc of a trimethyl phosphate solution was added to this, the solution was stirred for one hour, and then 0.0683 gram of sodium carbonate was added. The solution was then stirred at a room temperature for three hours. After the solution was left at rest at 50° C. under a sealed condition for 24 hours, it was further left at rest at 80° C. under a sealed condition for 72 hours. Upon evaporation of the solvent, the resultant sample was subjected to heat treatment at 500° C. under a nitrogen gas atmosphere for 4 hours to obtain the mixed conductor of this embodiment.

Embodiment 9

Three grams of resorcinol was dissolved in 12 cc of pure water, to which 4.05 cc of a formaldehyde solution was then added. While stirring this, 0.736 cc of an aqueous phosphate solution was gradually added. After the solution was left standing at 70° C. under a sealed condition for 24 hours, the solvent was removed. The resultant sample was subjected to heat treatment at 1000° C. under a nitrogen gas atmosphere for 4 hours to obtain the mixed conductor of this embodiment.

Embodiment 10

Three grams of resorcinol was dissolved in 12 cc of pure water, to which 4.05 cc of a formaldehyde solution was then added. Then, 0.028 gram of sodium carbonate was added. After the solution was left standing at 50° C. for 24 hours and then at 80° C. for 72 hours both under a sealed condition, the gel was ground. The ground gel was washed separately with a 0.1N hydrochloric acid solution, pure water, and ethanol in that order.

The washed gel is immersed in a solution of 1.5 gram of tungstophosphoric acid in 50 cc of ethanol. After being immersed at 50° C. for 48 hours, the gel was subjected to heat treatment at 700° C. under a nitrogen gas atmosphere for 4 hours to obtain the mixed conductor of this embodiment.

Embodiment 11

Three grams of resorcinol was dissolved in 12 cc of pure water, to which 4.05 cc of a formaldehyde solution was then added. Added to this were a solution of 2.18 grams of phenylphosphonic acid in a mixture of ethanol and pure water, with an ethanol/pure water volume ratio of 1/1, and then 0.114 gram of sodium carbonate. After being stirred at a room temperature for 12 hours, the solution was left standing at 60° C. for 24 hours and then at 80° C. for 48 hours both under a sealed condition. The resultant sample gel was subjected to heat treatment at 800° C. under a nitrogen gas atmosphere for 4 hours to obtain the mixed conductor of this embodiment.

After Embodiments 6-11 thus obtained were ground in a ball mill and were pressure-formed into samples having a diameter of 15 mm and a thickness of 3 mm. To measure the electronic specific resistance of each sample, the sample was interposed between collector plates made of gold and a DC current was applied. The electronic specific resistance was obtained from the voltage in response to that application. To measure the ionic conductance of the obtained samples, each sample was interposed between Nafion membranes as well as catalyst layers to form a holder shown in FIG. 5. The holder was placed in a container, and nitrogen gas or hydrogen gas at a temperature of 60° C. and a humidity of 100% was introduced into the container. A voltage was applied to the holder. The ionic conductance was obtained from the response current.

The results are shown in Table 2

TABLE 2

| | Electronic specific resistance (O · cm) | Proton conductance (S/cm) |
|---|---|---|
| Embodiment 6 | 10 | $7.1 \times 10^{-4}$ |
| Embodiment 7 | 0.18 | $1.1 \times 10^{-2}$ |
| Embodiment 8 | 50 | $5.3 \times 10^{-4}$ |
| Embodiment 9 | 0.07 | $1.0 \times 10^{-3}$ |
| Embodiment 10 | 0.14 | $1.5 \times 10^{-4}$ |
| Embodiment 11 | 0.14 | $2.7 \times 10^{-3}$ |

As in Embodiments 1-3, the stability of these Embodiments to water were confirmed by immersing 0.1 gram of each sample in pure water at a room temperature and measuring the concentration of phosphorus in the immersed sample (the tungsten concentration in Embodiment 10) over time. The concentrations of phosphorus (the tungsten concentration in Embodiment 10) substantially stabilized after 50 hours from the immersion. Even after 200 hours of immersion, with respect to the initial phosphorus concentration (the tungsten concentration in Embodiment 10), 45%, 81%, 86%, 90%, 95%, 75% of phosphorus (or tungsten) remained in the samples in Embodiments 6, 7, 8, 9, 10, and 11, respectively.

The present invention is not limited at all by the embodiments and the description of the embodiments. The present invention also contains various changes and modifications thereto without departure from the description of claims which follow in a range that can be easily attained by a person having ordinary skill in the art.

What is claimed is:

1. A mixed conductor in the form of a single material comprising inorganic electron conductor portions and inorganic proton conductor portions, the single material being formed by pyrolysis of a mixture comprising an organic precursor of the inorganic electron conduction portions and a proton conductor phase of inorganic electron conductor portions, said inorganic electron conductor portions being in the form of electron-conducting carbon skeletons and said inorganic proton conductor portions being stably fixed to said electron-conducting carbon skeletons by at least one of covalent bonding, intercalation and inclusion, said mixed conductor exhibiting both electron and proton conduction at a temperature below 200° C.

2. The mixed conductor according to claim 1, wherein said electron conductors are obtained by carbonizing at least one member selected from the group consisting of aliphatic hydrocarbons, aromatic hydrocarbons and derivatives thereof.

3. The mixed conductor according to claim 2, wherein said at least one member is selected from the group consisting of polyacetylene, resorcinol, phenol, phenylphenol, polyaniline, polypyrrole, polythiophene, phenylphosphoric acid, phenylsilane alkoxide, pyrogallol, and dihydroxybiphenyl.

4. The mixed conductor according to claim 1, wherein said proton conductor portions contain at least one member selected from the phosphorus-containing compounds, sulfur-containing compounds, carboxylic acids, boric acid and inorganic solid-state acids.

5. The mixed conductor according to claim 1, wherein said electron conductor portions have consecutive carbon-carbon bonds including a carbon-carbon double bond.

6. The mixed conductor according to claim 1, wherein said mixed conductor supports a noble metal catalyst.

7. A mixed conductor in the form of a single material produced by pyrolysis and comprising inorganic electron conductor portions made of carbonaceous material obtained by carbonizing an organic precursor and inorganic proton conductor portions, said inorganic electron conductor and inorganic proton conductor portions being fixed together by at least one of covalent bonding, intercalation and inclusion, said mixed conductor exhibiting both electron and proton conduction at a temperature below 200° C.

8. The mixed conductor according to claim 7, wherein the electron conductors are fixed to the proton conductors by a covalent bond.

9. The mixed conductor according to claim 7, wherein the electron conductors are fixed to the proton conductors by intercalation.

10. The mixed conductor according to claim 7, wherein the electron conductors are fixed to the proton conductors by inclusion.

11. A method of producing a mixed conductor in the form of a single material comprising:

a first step of obtaining a high molecular weight precursor by mixing and polymerizing at least one member selected from the group consisting of aliphatic hydrocarbon, aromatic hydrocarbon and derivatives thereof with a proton conducting material; and a second step of burning the high molecular weight precursor, obtained in the first step, in an inert atmosphere.

12. A method of producing a mixed conductor in the form of a single material comprising:

a first step of polymerizing at least one member selected from the group consisting of aliphatic hydrocarbons, aromatic hydrocarbons and derivatives thereof;

a second step of mixing a proton conducting material with the polymerized member to obtain a high molecular weight precursor; and a third step of burning the high molecular weight precursor obtained in the first step in an inert atmosphere to convert the polymerized member to electron conducting portions.

13. A mixed conductor in the form of a single material producing method wherein an organic compound is bound or mixed with a compound having proton conduction to obtain a high polymer precursor, and said high polymer precursor is carbonized to thereby impart electron conduction to the precursor.

14. The mixed conductor producing method according to claim 11, wherein said at least one member is selected from the group consisting of polyacetylene, resorcinol, phenol, phenylphenol, polyaniline, polypyrrole, polythiophene, phenylphosphoric acid, phenylsilane alkoxide, pyrogallol, and dihydroxybiphenyl.

15. The mixed conductor producing method according to claim 11, wherein said proton conducting material is at least one member selected from the group consisting of phosphorus-containing compounds, sulfur-containing compounds, carboxylic acids, boric acid, and inorganic solid-state acids.

16. The mixed conductor producing method according to claim 11, comprising a third step of supporting a noble metal catalyst on the product burned in said second step.

17. The mixed conductor producing method according to claim 11, wherein the first step comprises heating the high molecular precursor or heating the high molecular precursor under a pressurized condition.

18. The mixed conductor according to claim 1 exhibiting both electron and proton conduction at temperatures within a range of from room temperature to 60° C.

19. The mixed conductor according to claim 1 wherein said electron and proton conductor portions are covalently bound in a single polymeric molecular structure.

20. The mixed conductor according to claim 7 exhibiting both electron and proton conduction at temperatures within a range of from room temperature to 60° C.

21. The mixed conductor according to claim 7 wherein said electron and proton conductor portions are covalently bound in a single polymeric molecule structure.

22. The mixed conductor according to claim 1 wherein the electron-conducting carbon skeletons are bridged by the proton conductor portions.

23. The mixed conductor according to claim 7 wherein the electron conductor portions are carbon skeletons bridged by the proton conductor portions.

24. The mixed conductor according to claim 1 wherein the mixed conductor is a single compound.

25. The mixed conductor according to claim 7 wherein the mixed conductor is a single compound.

* * * * *